United States Patent
Kwon et al.

(10) Patent No.: US 10,332,033 B2
(45) Date of Patent: Jun. 25, 2019

(54) SELF-LEARNING BASED DIALOGUE APPARATUS AND METHOD FOR INCREMENTAL DIALOGUE KNOWLEDGE

(71) Applicant: ELECTRONICS AND TELECOMMUNICATIONS RESEARCH INSTITUTE, Daejeon (KR)

(72) Inventors: Oh Woog Kwon, Daejeon (KR); Young Kil Kim, Daejeon (KR); Yun Keun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 130 days.

(21) Appl. No.: 15/405,425

(22) Filed: Jan. 13, 2017

(65) Prior Publication Data

US 2017/0213545 A1 Jul. 27, 2017

(30) Foreign Application Priority Data

Jan. 22, 2016 (KR) .................. 10-2016-0008164

(51) Int. Cl.
 *G10L 15/01* (2013.01)
 *G10L 15/22* (2006.01)
 (Continued)

(52) U.S. Cl.
 CPC .......... *G06N 20/00* (2019.01); *G06F 17/241* (2013.01); *G06F 17/279* (2013.01); *G10L 15/1815* (2013.01); *G10L 15/22* (2013.01)

(58) Field of Classification Search
 CPC ......... G10L 15/22; G10L 13/08; G10L 15/01; G10L 15/1815; G10L 2015/223;
 (Continued)

(56) References Cited

U.S. PATENT DOCUMENTS

| 2008/0010070 A1 | 1/2008 | Kim et al. |
| 2011/0153322 A1 | 6/2011 | Kwak et al. |

(Continued)

FOREIGN PATENT DOCUMENTS

| JP | 2015-230384 A | 12/2015 |
| KR | 10-2011-0072847 A | 6/2011 |

*Primary Examiner* — Angela A Armstrong
(74) *Attorney, Agent, or Firm* — LRK Patent Law Firm

(57) ABSTRACT

An incremental self-learning based dialogue apparatus for dialogue knowledge includes a dialogue processing unit configured to determine a intention of a user utterance by using a knowledge base and perform processing or a response suitable for the user intention, a dialogue establishment unit configured to automatically learn a user intention stored in a intention annotated learning corpus, store information about the learned user intention in the knowledge base, and edit and manage the knowledge base and the intention annotated learning corpus, and a self-knowledge augmentation unit configured to store a log of a dialogue performed by the dialogue processing unit, detect and classify an error in the stored dialogue log, automatically tag a user intention for the detected and classified error, and store the tagged user intention in the intention annotated learning corpus.

15 Claims, 7 Drawing Sheets

(51) Int. Cl.
*G06N 20/00* (2019.01)
*G10L 15/18* (2013.01)
*G06F 17/24* (2006.01)
*G06F 17/27* (2006.01)

(58) Field of Classification Search
CPC ........... G10L 2015/225; G10L 15/1822; G10L 15/20; G01C 21/3608; G06F 17/241; G06F 17/279; G06N 99/005; G06N 20/00
See application file for complete search history.

(56) References Cited

U.S. PATENT DOCUMENTS

| | | | |
|---|---|---|---|
| 2014/0136212 A1* | 5/2014 | Kwon | G10L 15/22 704/275 |
| 2014/0188477 A1 | 7/2014 | Zhang | |
| 2014/0195226 A1 | 7/2014 | Yun et al. | |
| 2016/0155445 A1* | 6/2016 | Selfridge | G10L 15/1822 704/249 |

* cited by examiner

SELF-LEARNING BASED DIALOGUE APPARATUS AND METHOD FOR INCREMENTAL DIALOGUE KNOWLEDGE

CROSS-REFERENCE TO RELATED APPLICATIONS

This application claims priority under 35 U.S.C. § 119 to Korean Patent Application No. 10-2016-0008164, filed Jan. 22, 2016, the disclosure of which is incorporated herein by reference in its entirety.

BACKGROUND OF THE INVENTION

1. Field of the Invention

The present invention relates to an apparatus and method for incrementally enhancing dialogue knowledge through self-learning, and more particularly, to an apparatus and a method which determine a speech of a user, which a dialogue system cannot understand, in a dialogue between the user and the dialogue system to enhance a performance of the dialogue system.

2. Description of Related Art

Only when a spoken dialogue system and a text-based dialogue system have dialogue knowledge necessary for having a dialogue with a user, the spoken dialogue system and the text-based dialogue system can appropriately respond to an utterance of the user. Generally, since dialogue knowledge is established by developers or experts in application field, the cost, a storage space, or a development time is limited, and for this reason, the dialogue knowledge is inevitably established in the limited field and range. Therefore, generally, the application field of the dialogue system is limited due to the limited dialogue knowledge.

In order to provide a dialogue system for various fields such as information services and education, developers and knowledge experts should develop massive dialogue knowledge in consideration of various situations, and moreover, after the development, an operation of collecting dialogue logs for a certain duration, analyzing the collected dialogue logs, and adding and establishing insufficient dialogue knowledge to augment dialogue knowledge is needed for processing various utterances of a user.

Such a service enhancement operation should be periodically repeated for responding to new requests of users, but since a complicated operation should be performed for designing a dialogue model for the new requests and establishing dialogue knowledge based on the dialogue model, the new requests cannot easily be applied to a dialogue system which has been already developed and is being used. Therefore, in the related art dialogue system, much time and cost are needed for reflecting new user requirements, and a technical solution for applying the new user requirements to a system which is operating should be solved.

However, users can distinguish a speech easily recognized by the system and an unrecognized speech through learning before correction for the error is reflected, and thus, an update operation which expends time and cost could be meaningless to users.

For this reason, since a dialogue system capable of recognizing speeches of all users should understand speeches of users which are not frequently used, much time and cost are consumed at an initial stage.

Korean Patent Application Publication No. 10-2011-0072847 discloses a dialogue management system and method and relates to a method which, when an intention of a user is relevant to a subject unprepared by a dialogue system, induces the user to a dialogue suitable for an aim of the dialogue system and performs the induced dialogue. However, the dialogue management system and method cannot solve a problem of the related art which cannot update or enhance the dialogue system when an intention of a user is misunderstood or a system suitable for the intention of the user is not prepared.

U.S. Patent Application Publication No. 2014/0188477 discloses a method of correcting a response in a natural language dialogue system. When a user asks an additional question because a response list of a system for a first speech of the user is inaccurate, the method again provides a response list except a response to the first speech to increase an accuracy of a response. However, the method also has a technical substance for finding an optimal response from among responses of a related art system, and thus, if a response desired by the user is not stored in the system, it is unable to provide an appropriate response.

SUMMARY

Accordingly, the present invention provides a dialogue apparatus and method which recognize and learn a speech of a user incapable of being processed by a dialogue system, thereby enhancing performance of the dialogue system or providing materials for enhancing performance of the dialogue system in real time.

The object of the present invention is not limited to the aforesaid, but other objects not described herein will be clearly understood by those skilled in the art from descriptions below.

In one general aspect, an incremental self-learning based dialogue apparatus for dialogue knowledge, including one or more processors, includes: a dialogue processing unit configured to determine a dialogue intention of a user utterance by using a knowledge base and perform processing or a response suitable for the dialogue intention; a dialogue establishment unit configured to automatically learn an intention stored in an intention annotated learning corpus, store learned information about the learned dialogue intention in the knowledge base, and edit and manage the knowledge base and the intention annotated learning corpus; and a self-knowledge augmentation unit configured to store a log of a user dialogue performed by the dialogue processing unit, detect and classify an error in the stored dialogue log, automatically annotate intention into user utterances with the detected and classified error, and store the annotated intention in the intention annotated learning corpus.

In another general aspect, an incremental self-learning based dialogue method for dialogue knowledge includes: determining an intention of a user utterance by using a knowledge base and performing processing or a response suitable for the intention; storing a log of a dialogue between the user and a dialogue system including the processing or the response suitable for the user utterance and intention and the user speech; detecting and classifying a user utterance, which is an error, in the stored dialogue log; estimating an intention of the user utterance classified as the error; and storing the user utterance classified as the error and the estimated intention in a intention annotated learning corpus, automatically learning the intention stored in the dialogue intention annotated learning corpus which has been updated, and automatically storing the learned intention in the knowledge base.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
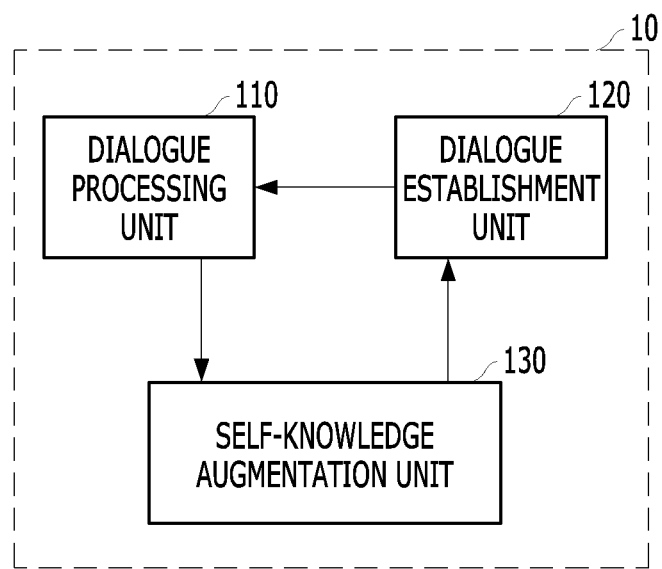
FIG. 1 is a diagram illustrating a structure of a dialogue apparatus according to an embodiment of the present invention.

FIG. 1 is a diagram illustrating a structure of an incremental self-learning based dialogue apparatus 10 for dialogue knowledge according to an embodiment of the present invention.

The dialogue apparatus 10 may include a dialogue processing unit 110, a dialogue establishment unit 120, and a self-knowledge augmentation unit 130.

The dialogue processing unit 110 may process a user utterance by having a dialogue with the user.

The dialogue establishment unit 120 enables dialogue knowledge necessary for the dialogue processing unit 110 to be easily established.

The self-knowledge augmentation unit 130 may obtain insufficient dialogue knowledge from a dialogue log to augment dialogue knowledge in real time, thereby enhancing performance of the dialogue processing unit 110. According to an embodiment of the present invention, the dialogue processing unit 110 may supply a feedback to the dialogue establishment unit 120 through the self-knowledge augmentation unit 130, and thus, dialogue knowledge may be augmented and reflected in real time, thereby reducing time and cost which are expended in enhancing performance of the dialogue apparatus 10.

Figure 2:
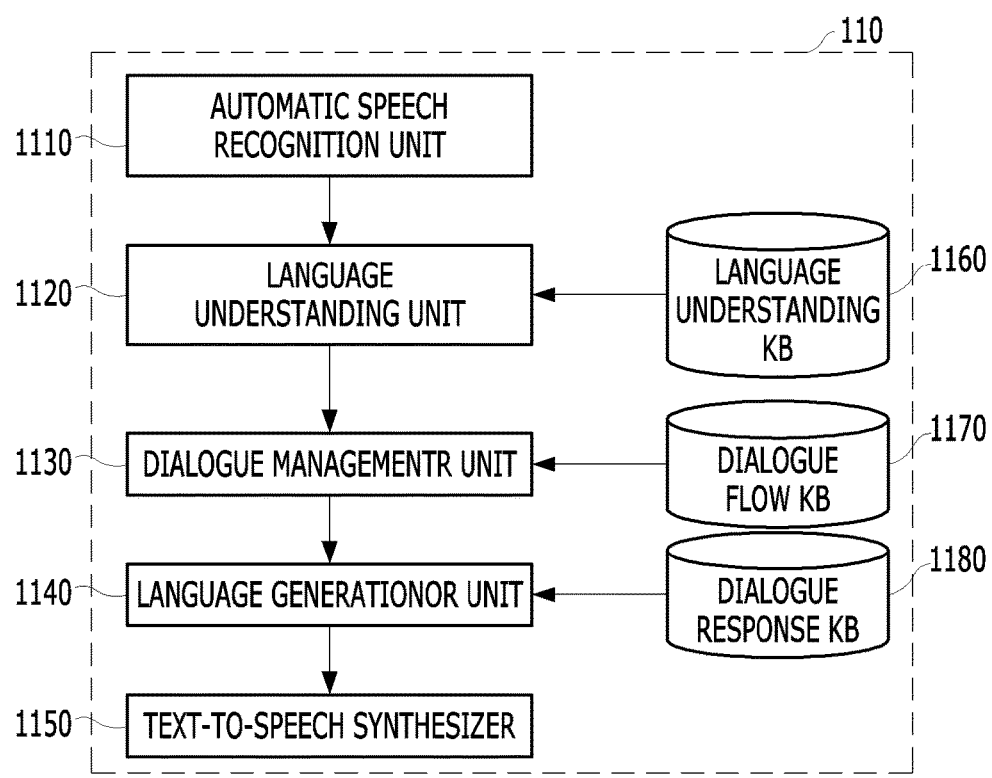
FIG. 2 is a structure diagram of a dialogue processing unit of a dialogue apparatus according to an embodiment of the present invention.

FIG. 2 illustrates a structure of the dialogue processing unit 110 according to an embodiment of the present invention.

The dialogue processing unit 110, a spoken dialogue system, may include an automatic speech recognition unit 1110, a language understanding unit 1120, a dialogue management unit 1130, a language generation unit 1140, and a text-to-speech synthesizer 1150.

The automatic speech recognition unit 1110 may recognize a voice speech of a user as a text sentence.

The language understanding unit 1120 may analyze and understand the recognized sentence of the user to determine a intention of the user.

The dialogue management unit 1130 may propose an appropriate reaction and response according to a dialogue context and a processing task, based on the determined the user intention and may manage a dialogue history which is context information about a dialogue process.

The language generation unit 1140 may generate the proposed reaction and response as texts, and the text-to-speech synthesizer 1150 may change the generated text response to a voice.

If the dialogue processing unit 110 is a text-based dialogue system, the dialogue processing unit 110 may be configured without the automatic speech recognition unit 1110 and the text-to-speech synthesizer 1150.

The language understanding unit 1120 may classify an intention of a user utterance as one of predefined user intentions by using a language understanding knowledge base (KB) 1160. The language understanding KB 1160 may be automatically generated through learning based on a intention annotated learning corpus 1230 of the dialogue establishment unit 120. The intention annotated learning corpus 1230 may be a corpus for attaching a predefined user intention to a collected user utterance.

The dialogue management unit 1130 may receive the user intention classified by the language understanding unit 1120 to determine an action which enables a predefined task to be efficiently processed.

To this end, the dialogue management unit 1130 may compare a user intention with a context of a dialogue history which includes a processing result, a response, and/or the like obtained by a previous user utterance, and may select an efficient action from a dialogue flow KB 1170 where an action processing flow and a control method for a predefined task to process are described.

The language generation unit 1140 may generate a dialogue indicating the action selected by the dialogue management unit 1130 under a current dialogue history, and in this case, the generation of the dialogue may be performed based on a dialogue response KB 1180 where a dialogue context and a system utterance pattern based on a system operation are described.

Figure 3:
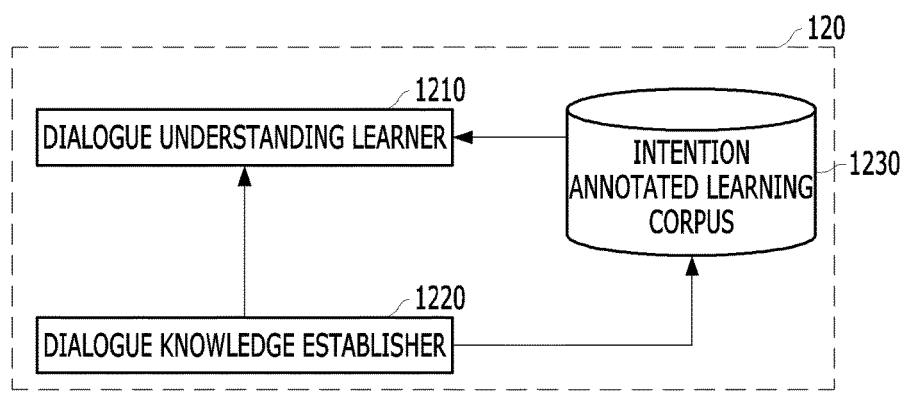
FIG. 3 is a structure diagram of a dialogue establishment unit of a dialogue apparatus according to an embodiment of the present invention.

FIG. 3 illustrates a structure of the dialogue establishment unit 120 according to an embodiment of the present invention.

Referring to FIG. 3, the dialogue establishment unit 120 may include a dialogue understanding learner 1210, a dialogue knowledge establisher 1220, and a intention annotated learning corpus 1230.

The dialogue understanding learner 1210 may automatically perform learning for classifying a predefined user intention from the intention annotated learning corpus 1230 and may store information obtained through the learning in the language understanding KB 1160.

The dialogue knowledge establisher 1220 may directly establish the intention annotated learning corpus 1230. Also, the dialogue knowledge establisher 1220 may establish a user intention of a new sentence, based on information learned from a previous learning corpus by using the language understanding unit 1120, thereby providing convenience to intention annotators.

Moreover, when the intention annotated learning corpus 1230 is updated or changed, a new language understanding KB 1160 may be established by using the dialogue understanding learner 1210.

Therefore, the dialogue knowledge establisher 1220 may edit, add, delete, and manage all dialogue knowledges of the language understanding KB 1160, the dialogue flow KB 1170, and the dialogue response KB 1180 which are necessary for dialogue processing by the dialogue processing unit 110.

Figure 4:
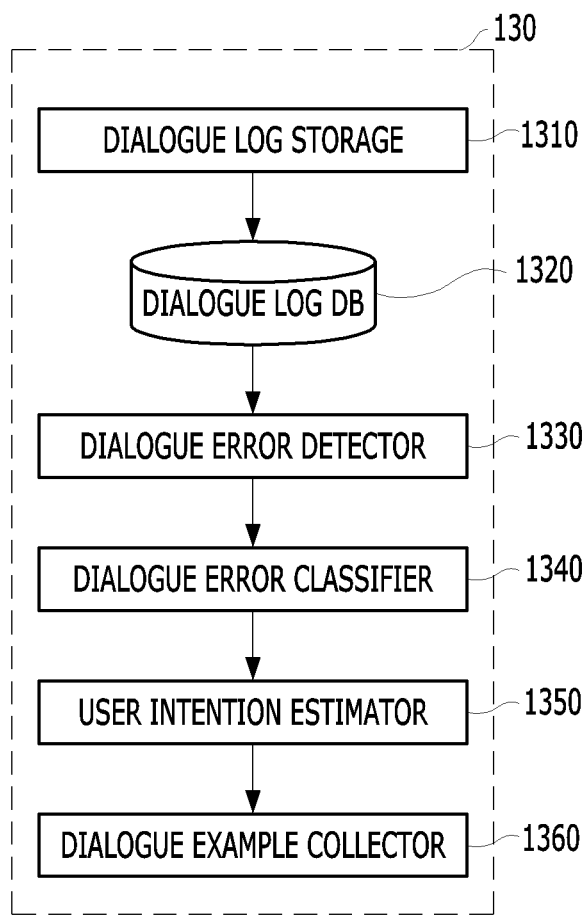
FIG. 4 is a structure diagram of a self-knowledge augmentation unit of a dialogue apparatus according to an embodiment of the present invention.

FIG. 4 illustrates a structure of the self-knowledge augmentation unit 130 according to an embodiment of the present invention.

The self-knowledge augmentation unit 130 may include a dialogue log storage 1310, a dialogue error detector 1330, a dialogue error classifier 1340, a user intention estimator 1350, and a dialogue example collector 1360.

The dialogue log storage 1310 may store a dialogue record between the dialogue processing unit 110 and the user, details obtained through processing, and information including dialogue history thereof in a dialogue log database (DB) 1320 in real time.

The dialogue error detector 1330 may receive a dialogue log, when a dialogue with the user ends, from the dialogue log DB 1320 in real time to find a part processed as an error by the dialogue processing unit 110.

The dialogue error classifier 1340 may determine whether an error detected by the dialogue error detector 1330 is a speech recognition error or a language understanding error of a user utterance, a dialogue management and language generation error, or an error caused by an unregistered user intention.

If the error detected by the dialogue error detector 1330 is the speech recognition error or the language understanding error, the user intention estimator 1350 may estimate a user intention suitable for the user utterance, based on dialogue log information, thereby augmenting the intention annotated learning corpus 1230.

If the error detected by the dialogue error detector 1330 is the dialogue management and language generation error or the error caused by the unregistered user intention, the dialogue example collector 1360 may collect a corresponding error and its related dialogue log information and may supply the collected error to a manager or a developer of the dialogue processing unit 110. Also, the dialogue example collector 1360 may collect an error which is not added to the intention annotated learning corpus 1230 because the user intention estimator 1350 does not automatically assign user intention to the user utterance related to the error, and may supply the collected error and its related dialogue log information to the manager or the developer of the dialogue processing unit 110.

The manager or the developer may search for similar examples in a massive dialogue corpus and may compare the found examples with a dialogue example collected by the dialogue example collector 1370, thereby easily establishing dialogue knowledge in the dialogue knowledge establisher 1220.

When the intention annotated learning corpus 1230 is extended and changed by the self-knowledge augmentation unit 130, the dialogue understanding learner 1210 may be driven in order for the dialogue knowledge establisher 1220 to perform new learning.

The dialogue log storage 1310 may store all information that is analyzed and output by each module of the dialogue processing unit 110.

For example, stored information from the automatic speech recognition unit 1110 may include a speech voice of the user, speech recognition reliability of all of recognized candidate sentences, and speech recognition reliability of each of recognized words.

Stored information from the language understanding unit 1120 may include a user intention candidate list and reliability of each of user intention candidates, and stored information from the dialogue management unit 1130 may include information indicating a dialogue history, analyzed candidate actions, and reliability of each of the analyzed candidate actions. Information from the language generation unit 1140 may include a system utterance pattern for system response generation.

When a dialogue between the dialogue processing unit 110 and the user ends, the dialogue error detector 1330 may extract all dialogue log information in the dialogue log DB 1320 to detect whether an error occurs when the dialogue processing unit 110 analyzes and processes a user utterance. In this case, the dialogue error detector 1330 may analyze a dialogue flow to detect an error part.

The dialogue flow KB 1170 may be used for detecting the error part, and the dialogue error detector 1330 may estimate a user utterance, which is not defined in the dialogue flow KB 1170 and thus is low in possibility of appearance in the middle of dialogue, as an error candidate.

In a method of determining a dialogue undefined in the dialogue flow KB 1170, the undefined dialogue may be determined based on a utterance to be currently determined, a degree to which n number of previous and subsequent user utterances are matched with each other, and a degree to which n number of previous and subsequent system responses are matched with each other. In this case, the determination may be performed without a part previously estimated as an error candidate.

In addition, the dialogue error detector 1330 may detect a dialogue error part through the following methods.

A case where a user makes an utterance in a sentence similar to an immediately previous user utterance, a response of previous user utterance may not be an answer desired by a response to a previous user utterance and thus may be high in probability of recheck, and thus may be determined as an error. An operation of determining whether a utterance is similar to a previous utterance may be performed by using a letter similarity and/or a word similarity, in consideration of a speech recognition error.

Moreover, in a case where a user directly recognizes an error and makes a utterance on complaint or discontent about the error or a will of correcting the error, an immediately previous utterance may be estimated as an error candidate.

A case, where utterances of a user differ but the language understanding unit 1120 continuously understands the utterances as the same user intention, may also be estimated as an error candidate. However, recognitions of a slot and a slot value may differ. On the other hand, a case where a user intention is recognized as another user intention but a utterance is made on the same slots and their values as a previous slots and their values may also correspond to an error candidate.

Most of the errors which are extracted as described above occur because a user determines errors occurring in speech recognition, understanding, and action by the dialogue processing unit 110, and makes the same utterance or makes an utterance on correction or complaint, and thus, a flow of a dialogue which is not considered in design occurs.

Figure 5:
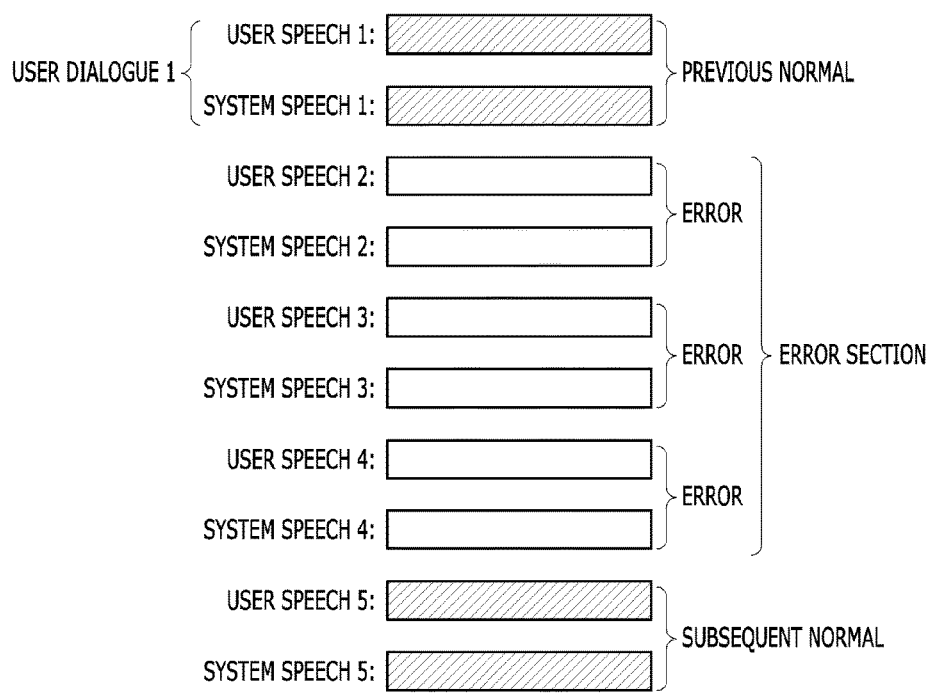
FIG. 5 is a diagram defining an error section of a user dialogue in a dialogue apparatus according to an embodiment of the present invention.

FIG. 5 illustrates parts where errors occur in performing a dialogue between a user and the dialogue processing unit 110. A section where an error continuously occurs may be referred to as "error section", a normal part immediately previous to the error section may be referred to as "previous normal", and a normal part immediately next to the error section may be referred to as "subsequent normal".

The dialogue error classifier 1340 may determine whether an error detected by the dialogue error detector 1330 is a speech recognition or language understanding error, a dialogue management or language generation error, or an unregistered error.

The speech recognition or language understanding error may correspond to a case where a similarity between user utterances in the error section is high, a similarity between user intentions and a similarity between slot recognitions for each utterance are high, and a similarity between user utterances in the error section and a user utterance in the "subsequent normal" part, a similarity between user intentions in the error section and a user intention in the "subsequent normal" part and a similarity between slot recognitions in the error section and a slot recognition in "subsequent normal" part are high.

The dialogue management or language generation error may correspond to a case where a similarity between user utterances, a similarity between user intentions and a similarity between slot recognitions in the error section are high but a similarity between user utterances in the error section and a user utterance in the "subsequent normal" part, a similarity between user intentions in the error section and a user intention in the "subsequent normal" part and a similarity between slot recognitions in the error section and a slot recognition in "subsequent normal" part are not high.

The unregistered error may be an error which differs from the above-described two types of errors.

The user intention estimator 1350 may process an error, based on a type of an error classified by the dialogue error classifier 1340.

A user utterance classified as the speech recognition or dialogue understanding error may be determined whether to enable a user intention of the "subsequent normal" to be assigned. When a possibility that the user intention of the "subsequent normal" is assigned is high, the user intention may be automatically assigned, and the intention annotated learning corpus 1230 may extend, and otherwise, the user utterance may be recognized as a utterance of a new user intention which is not predefined and may be processed by a knowledge expert.

In order to assign the user intention of the "subsequent normal", a similarity between a user utterance of the "subsequent normal" part and a user utterance classified as an error should be high, a user intention of the "subsequent normal" part and an estimated user intention should be high, and slot values in the user utterance classified as the error should accurately match slot values in the user intention of the "subsequent normal" part.

When the similarity between the user utterance of the "subsequent normal" part and the user utterance classified as the error is high and, the user intention of the "subsequent normal" part and the user intention classified as the error is high, but the slot values in the user utterance classified as the error do not match the slot values in the user intention of the "subsequent normal" part, the user intention estimator 1350 may determine that a possibility of a speech recognition error for a slot value is high, may supply a user voice speech stored in the dialogue log storage 1310, a recognized sentence, and the user utterance of the "subsequent normal" part to the dialogue knowledge establisher 1220 as one set, thereby allowing the supplied set to be used for correcting a speech recognition error.

Errors, which are classified as the speech recognition or language understanding error by the dialogue error classifier 1340 but are not automatically assigned a user intention by the user intention estimator 1350 and is not determined as the speech recognition error, may be reclassified as unregistered errors and may be transferred to the dialogue example collector 1360.

The dialogue example collector 1360 may search for a system reaction, which is appropriate for an error section which is classified as the dialogue management or language generation error or an unregistered error by the dialogue error classifier 1340 and the user intention estimator 1350, in a massive dialogue corpus and may supply the found system response candidate to the dialogue knowledge establisher 1220 as a system utterance pattern candidate.

By using the dialogue knowledge establisher 1220, the knowledge expert may determine whether there is an error in the dialogue flow KB 1170 and the dialogue response KB 1180, based on an error section of a dialogue log and sentences similar to a user utterance of an error section and various answers corresponding to the similar sentences collected by the dialogue example collector 1360, and may correct the determined error or may improve knowledge bases for a new function and new system response.

In a case where the user makes a request utterance on a function which is not be provided, in order to understand the request utterance, the language understanding unit 1120 may extend the intention annotated learning corpus 1230 by using a user utterance of a dialogue log and collected similar speeches, and the dialogue understanding learner 1210 may perform re-learning, thereby generating a new language understanding KB 1160.

A case, where an error is the speech recognition or language understanding error but is abnormally classified by the dialogue error classifier 1340, can occur. However, when the case occurs, the knowledge expert may correct the abnormal classification and may establish dialogue knowledge by using the dialogue knowledge establisher 1220 and similar sentences collected by the dialogue example collector 1360.

The dialogue example collector 1360 may transfer learning sentences, where a user intention is automatically assigned to a user utterance of an error section by the user intention estimator 1350, to the dialogue knowledge establisher 1220 to allow the intention annotated learning corpus 1230 to be extended. When the intention annotated learning corpus 1230 extends, the dialogue understanding learner 1210 may generate a new language understanding KB 1160, thereby enhancing performance of the dialogue processing unit 110.

The dialogue example collector 1360 may transfer a user speech voice and a sentence, recognized as the speech recognition error by the user intention estimator 1350, to the dialogue knowledge establisher 1220, thereby enhancing performance of the automatic speech recognition unit 1110.

Figure 6:
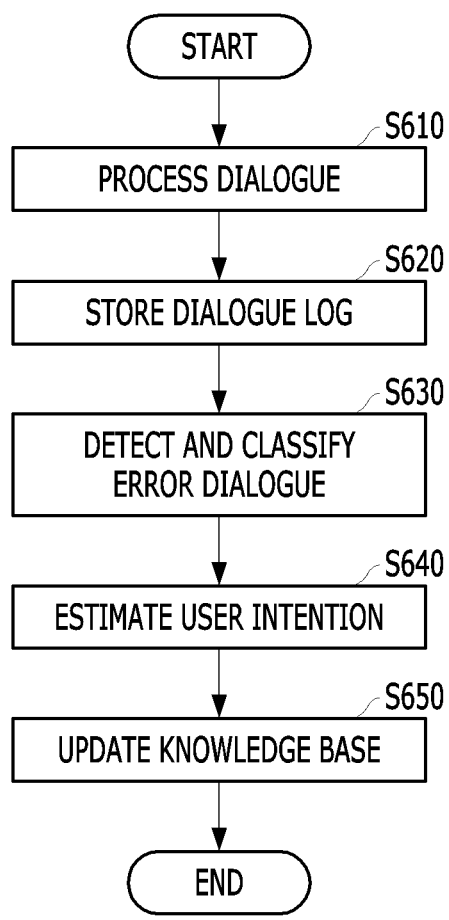
FIG. 6 is a flowchart of a dialogue method according to another embodiment of the present invention.

FIG. 6 is a flowchart of an incremental self-learning based dialogue method according to another embodiment of the present invention.

In a dialogue processing operation (S610), the dialogue apparatus may determine a user intention of a user utterance by using knowledge bases and may perform processing or generate a response suitable for the user intention. In a case when a dialogue is performed in speech, a speech recognition operation of converting a speech into a text and a speech synthesis operation of synthesizing a text corresponding to a response with a speech may be further performed.

When the dialogue processing operation (S610) ends, utterances of a user and responses of the dialogue system may be all stored as a log of a dialogue in step S620.

In step S630, the dialogue apparatus may analyze the stored dialogue log to detect a dialogue part corresponding to an error and may classify the detected dialogue part as a speech recognition error, a language understanding error, a dialogue management error, a language generation error, or an unregistered error. A detailed method is as described above.

The dialogue apparatus may estimate a user intention of the user utterance classified as the error in step S640, and when the user intention is estimated, the user utterance and the user intention may be stored in intention annotated learning corpus. When the intention annotated learning corpus is updated, the dialogue apparatus may automatically learn the user intention based on a intention annotated learning corpus obtained through the update to update a knowledge base for dialogue processing in step S650.

According to the features of the present invention, a knowledge base may be updated and enhanced based on errors of user utterances from a dialogue between the user and a system in real time, thereby providing a dialogue apparatus and a dialogue method which are very excellent in performance.

Figure 7:
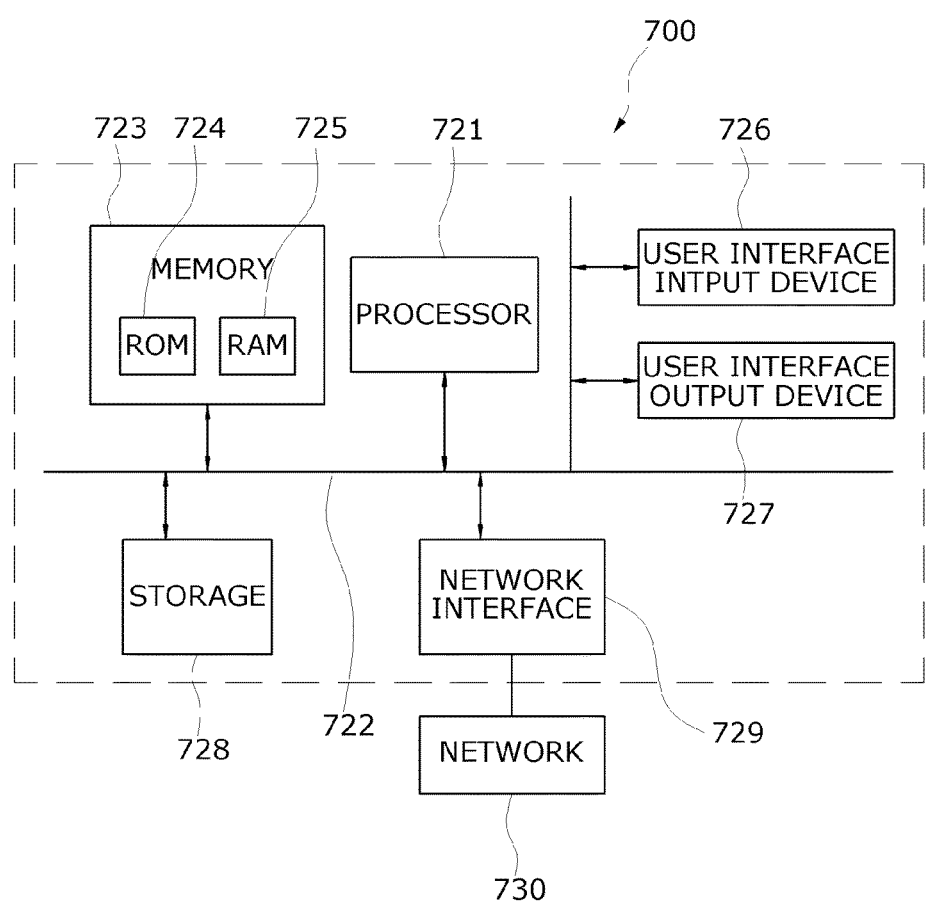
FIG. 7 is a structure diagram of a computer device for performing a dialogue method according to another embodiment of the present invention.

The incremental self-learning based dialogue method for dialogue knowledge according to an embodiment of the present invention may be implemented in a computer system or may be recorded in a recording medium. As illustrated in FIG. 7, the computer system may include one or more processors 721, a memory 723, a user input device 726, a data communication bus 722, a user output device 727, and a storage 728. The elements may perform data communication therebetween through the data communication bus 722.

The computer system may further include a network interface 729 coupled to a network 730. The one or more processors 721 may each be a central processing unit (CPU) or may be a semiconductor device that executes commands stored in the memory 723 and/or the storage 728.

The memory 723 and the storage 728 may each include various types of volatile or nonvolatile storage mediums. For example, the memory 723 may include a read-only memory (ROM) 724 and a random access memory (RAM) 725.

Therefore, the incremental self-learning based dialogue method for dialogue knowledge according to an embodiment of the present invention may be implemented as a method executable by a computer. When the incremental self-learning based dialogue method for dialogue knowledge according to an embodiment of the present invention is performed by a computer device, computer-readable commands may perform the recognition method according to an embodiment of the present invention.

The incremental self-learning based dialogue method for dialogue knowledge according to an embodiment of the present invention may also be embodied as computer-readable codes on a computer-readable recording medium. The computer-readable recording medium is any data storage device that may store data which may be thereafter read by a computer system. Examples of the computer-readable recording medium include read-only memory (ROM), random access memory (RAM), CD-ROMs, magnetic tapes, floppy disks, and optical data storage devices. The computer-readable recording medium may also be distributed over network coupled computer systems so that the computer-readable code may be stored and executed in a distributed fashion.

According to the embodiments of the present invention, in a case where the dialogue system cannot understand a utterance of a user, the dialogue apparatus may automatically recognize the case and may add a new learning sentence, thereby improving performance of the dialogue system in real time. Also, in a case where the dialogue system understands a utterance of a user but cannot provide an appropriate response utterance, the dialogue apparatus may continuously inform the case of a developer or a dialogue knowledge expert, thereby continuously improving the dialogue system.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims

What is claimed is:

1. An incremental self-learning based dialogue apparatus for dialogue knowledge, including one or more processors and memory for storing computer-executable instructions to be executed by the one or more processors and to cause the one or more processors to perform the steps in the following units, the dialogue apparatus comprising:
   a dialogue processing unit configured to determine a user intention of a user utterance by using a knowledge base and perform processing or generate a response suitable for the user intention;
   a dialogue establishment unit configured to automatically learn a user intention from an intention annotated learning corpus, store information about the learned user intention in the knowledge base, and edit and manage the knowledge base and the intention annotated learning corpus; and
   a self-knowledge augmentation unit configured to store a log of a dialogue performed by the dialogue processing unit, detect and classify an error in the stored dialogue log, automatically tag a user intention for the detected and classified error, and store the tagged user intention in the intention annotated learning corpus, wherein the self-knowledge augmentation unit comprises:
a dialogue log storage configured to store the log of the dialogue performed by the dialogue processing unit;
a dialogue error detector configured to detect an error from the dialogue log stored in the dialogue log storage; and
a dialogue error classifier configured to classify the detected dialogue error as a speech recognition error, a language understanding error, a dialogue management error, a language generation error, or an unregistered error,
wherein when the intention annotated learning corpus is updated or changed, a new language understanding learning knowledge base is established by using the dialogue establishment unit, and
wherein in a case where the dialogue error occurs in dialogue section which consists of two or more user utterances,
when a similarity between user utterances in the error section is high and a similarity between user utterances in the user dialogue of the error section and a user utterances immediately after the error section is high, the dialogue error classifier classifies the user utterances of the error section as the speech recognition error or the language understanding error, and
when the similarity between the user utterances in the error section is high but the similarity between user utterances in the error section and the user utterance immediately after the error section is low, the dialogue error classifier classifies the user utterances of the error section as the dialogue management error or the language generation error.

2. The dialogue apparatus of claim 1, wherein the knowledge base comprises a language understanding learning knowledge base, a dialogue flow knowledge base, and a dialogue response knowledge base.

3. The dialogue apparatus of claim 2, wherein the dialogue processing unit comprises:
a language understanding unit configured to classify the user intention of the user utterance as one of user intentions stored in the language understanding learning knowledge base;
a dialogue management unit configured to select processing or generate a response, which is suitable for the classified user intention, by using a dialogue context history and the dialogue flow knowledge base; and
a language generation unit configured to generate a system response indicating the selected processing or response by using the dialogue response knowledge base.

4. The dialogue apparatus of claim 3, wherein the dialogue processing unit further comprises:
an automatic speech recognition unit configured to convert the user utterance into a text sentence; and
a text-to-speech synthesizer configured to convert the system response, generated by the language generation unit, into a speech.

5. The dialogue apparatus of claim 1, wherein when the intention annotated learning corpus is changed, the dialogue establishment unit stores information, automatically learned based on the changed intention annotated learning corpus, in the knowledge base.

6. The dialogue apparatus of claim 1, wherein the self-knowledge augmentation unit further comprises a user intention estimator configured to estimate an intention of a user utterance classified as the speech recognition error or the language understanding error by the dialogue error classifier, based on dialogue log information stored in the dialogue log storage and add the user utterance and the estimated user intention into to the intention annotated learning corpus.

7. The dialogue apparatus of claim 1, wherein the self-knowledge augmentation unit further comprises a dialogue example collector configured to collect utterances, which are similar to user utterances classified as the dialogue management error, the language generation error, or the unregistered error by the dialogue error classifier, from a massive dialogue corpus, collect response dialogues suitable for the collected user utterances from the massive dialogue corpus, and provide the collected response dialogues.

8. The dialogue apparatus of claim 1, wherein the dialogue error detector detects a user utterance, which is similar to an immediately previous user utterance, as an error in the dialogue log, and determination of similarity is performed a sentence similarity and a word similarity between the user utterance and the immediately previous user utterance.

9. The dialogue apparatus of claim 1, wherein when an intention of a user utterance in the dialogue log is determined by the dialogue processing unit as complaint or discontent about the error of the dialogue apparatus or an utterance on a will of correction, the dialogue error detector detects the user utterance immediately previous to the user utterance as a dialogue error.

10. The dialogue apparatus of claim 1, wherein in when a plurality of continuous user utterances of the dialogue log differ but are determined as the same user intention by the dialogue processing unit, the dialogue error detector detects the plurality of continuous user speeches as a dialogue error.

11. An incremental self-learning based dialogue method for dialogue knowledge, the dialogue method being implemented by one or more processors executing computer-executable instructions stored in memory and to cause the one or more processors to perform the following steps:
determining an intention of a user utterance by using a knowledge base and performing processing or generating a response suitable for the user intention;
storing a log of a dialogue including the processing or the response suitable for the user intention and the user utterance;
detecting and classifying a user utterance, which is an error, in the stored dialogue log;
estimating a user intention of the user utterance classified as the error; and
storing the user utterance classified as the error and the estimated user intention in an intention annotated learning corpus, automatically learning the user intention stored in the intention annotated learning corpus which has been updated, and storing the learned user intention in the knowledge base,
wherein the detecting and classifying of the user utterance comprises classifying the detected dialogue error as a speech recognition error, a language understanding error, a dialogue management error, a language generation error, or an unregistered error,
wherein when the intention annotated learning corpus is updated or changed, a new language understanding learning knowledge base is established, and
wherein in a case where the dialogue error occurs in dialogue section which consists of two or more user utterances,
when a similarity between user utterances in the error section is high and a similarity between user utterances in the user dialogue of the error section and a user utterances immediately after the error section is high, the dialogue error classifier classifies the user utterances of the error section as the speech recognition error or the language understanding error, and when the similarity between the user utterances in the error section is high but the similarity between user utterances in the error section and the user utterance immediately after the error section is low, the dialogue error classifier classifies the user utterances of the error section as the dialogue management error or the language generation error.

12. The dialogue method of claim 11, wherein the knowledge base comprises a language understanding learning knowledge base, a dialogue flow knowledge base, and a dialogue response knowledge base.

13. The dialogue method of claim 12, wherein the determining of the user intention is performed based on a user intention stored in the language understanding learning knowledge base.

14. The dialogue method of claim 11, further comprising: after the detecting and classifying of the user utterance, when the dialogue error is classified as the speech recognition error or the language understanding error, estimating an intention of the user utterance which is the error, based on the stored dialogue log information and adding the user utterance which is the error and the estimated user intention into the intention annotated learning corpus.

15. The dialogue method of claim 11, further comprising: after the detecting and classifying of the user dialogue, when the dialogue error is the dialogue management error, the language generation error, or the unregistered error, collecting utterances similar to user utterances corresponding to the dialogue error from a massive dialogue corpus, collecting response dialogues suitable for the collected user utterances from the massive dialogue corpus, and providing the collected response dialogues to a user.

* * * * *